United States Patent
Kitajima et al.

(10) Patent No.: US 6,688,545 B2
(45) Date of Patent: Feb. 10, 2004

(54) FISHING-REEL SOUNDING DEVICE

(75) Inventors: Keigo Kitajima, Sakai (JP); Hirokazu Hiraoka, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/315,055

(22) Filed: Dec. 10, 2002

(65) Prior Publication Data

US 2003/0136866 A1 Jul. 24, 2003

(30) Foreign Application Priority Data

Jan. 22, 2002 (JP) .......................... 2002-013292
Mar. 28, 2002 (JP) .......................... 2002-092374

(51) Int. Cl.[7] .................. A01K 89/00; A01K 89/01; A01K 89/015
(52) U.S. Cl. .................................... 242/306
(58) Field of Search .......................... 242/305, 306, 242/307, 308

(56) References Cited

U.S. PATENT DOCUMENTS

| | | | | |
|---|---|---|---|---|
| 1,730,332 A | * | 10/1929 | Pflueger | 242/317 |
| 1,901,091 A | * | 3/1933 | Fawcett | 242/307 |
| 2,176,247 A | * | 10/1939 | Coxe | 242/307 |
| 2,344,209 A | * | 3/1944 | Lowe | 242/246 |
| 2,498,987 A | * | 2/1950 | Duncan | 242/232 |
| 3,490,714 A | * | 1/1970 | Underwood et al. | 242/270 |
| 4,162,049 A | * | 7/1979 | Stutz, Jr. | 242/292 |
| 5,544,832 A | * | 8/1996 | Okamoto | 242/245 |
| 5,918,826 A | | 7/1999 | Arkowski | |
| 6,010,087 A | * | 1/2000 | Merrill et al. | 242/318 |
| 6,189,822 B1 | * | 2/2001 | Ikuta | 242/296 |

* cited by examiner

*Primary Examiner*—Emmanuel Marcelo
(74) *Attorney, Agent, or Firm*—Shinjyu Global IP Counselors, LLP

(57) ABSTRACT

First sounding mechanism, which issues sound when spool rotates relative to spool shaft, is furnished with sound-emitting member, pawl member, and plate spring. Sound-emitting member is non-rotatably mounted on spool shaft, and has multiple jags radially jutting on its outer periphery. Pawl member has body portion pivotably mounted on spool; pawl portion formed on the spool-shaft side of the swing center; and arcuate contact face formed on body portion on a side of the swing center SC opposite spool shaft. First-side radius R1 of contact face, is smaller than its second-side radius R2. Plate spring mounted on spool at an end nearer the first side of contact-face is, and contacts contact face at the other end, urging pawl portion of pawl member to collide with sound-emitting member. In a spinning-reel sounding device having a pawl member, the tone fluctuations due to spool rotational direction are controlled.

13 Claims, 13 Drawing Sheets

FISHING-REEL SOUNDING DEVICE

BACKGROUND OF THE INVENTION

1. Field of the Invention

This invention generally relates to sounding devices. More specifically, the present invention relates to fishing-reel sounding devices that issue sound through rotation reciprocal between a first component, and a second component that rotates reciprocally with respect to the first component, of a fishing reel.

2. Background Information

In front-drag type spinning reels, a drag mechanism is fitted within the spool, which is mounted on the fore end of the spool shaft. The drag mechanism is provided in order to prevent line breakage due to excessive tension acting on the fishing line. The drag mechanism is furnished with one or several drag disks housed within the spool, a drag knob that presses on the drag disks, and a drag sounding mechanism that issues sound when the drag is operating.

With a spool in which a drag mechanism of this sort is fitted, when inordinate tension that exceeds the established drag force acts on the fishing line, the spool rotates in the line reel-out direction, which lets fishing line reel out to hold down increase in tension and keep the line from breaking. While the drag operates, in other words, when the spool (an example of a second component) rotates reciprocally with respect to the spool shaft (an example of a first component), the drag sounding mechanism issues sound.

Among drag sounding mechanisms known to date is a compactly constructed drag sounding mechanism having a sound-emitting member mounted non-rotatably to the spool shaft, a pawl member mounted on the spool so as to be pivotable around a shaft that is parallel to the spool shaft, and a plate spring that urges the pawl member into a contact posture. The sound-emitting member is a disk-shaped element with multiple gear-tooth-like jags formed on the outer periphery. The pawl member is an isosceles-triangle-shaped plate element. The corner flanked by the congruent edges contacts the sound-emitting member, while the plate spring contacts the bottom edge between the other two corners. The bottom edge of the pawl member that forms a contact surface is slightly curved into a round-arcuate form at a radius greater than the radius that joins to the pivotal center. The plate spring contacts the bottom edge, thereby urging the pawl member into the contact posture. The base end of the plate spring is mounted on the spool, and is bent over from the mounted end toward the bottom edge of the pawl member. This way, the plate spring extends from one side to the other side of the pawl-member bottom edge.

With a conventional drag sounding mechanism having a structure of this sort, when the spool rotates relative to the spool shaft during times the drag is operating, the pawl member pivots by being pressed on by the sound-emitting member. When the pawl member pivots, one of the sides of the pawl member presses on the plate spring. This way, the plate spring urges the pawl member, returning the pawl member into its original contact posture. The pawl member keeps colliding with the jags. Accordingly, the sounding mechanism issues sound.

With the conventional structure noted above, since the pivoting pawl member is made to collide with the sound-emitting member, it is possible for the sound-emitting member to issue a clear, crisp clicking noise. A problem nevertheless is that because the plate spring that extends from one side to the other side of the bottom edge of the pawl member is urged into contact with the bottom edge of the pawl member, the urging force varies according to the direction in which the spool rotates. Accordingly, the tone of the sound is altered. Specifically, between the situations in which the side of the pawl member nearer the mounting end of the plate spring presses on the plate spring, and in which the other side further from the mounting end presses on the plate spring, the displacement of the pawl member is greater and the urging force is greater when the side nearer the mounting end of the plate spring presses on the plate spring. This means that the urging force and the tone vary between the situations in which the spool rotates such that the one side presses, and in which the spool rotates such that the other side presses.

In view of the above, there exists a need for sounding device which overcomes the above mentioned problems in the prior art. This invention addresses this need in the prior art as well as other needs, which will become apparent to those skilled in the art from this disclosure.

SUMMARY OF THE INVENTION

An issue for the present invention is, in a fishing-reel sounding device having a pawl member, in controlling tone fluctuations due to a change in the spool rotational direction.

A fishing-reel sounding device in accordance with the first aspect of the invention is a device for issuing sound through rotation reciprocal between a first component of the fishing reel, and a second component thereof that rotates reciprocally with respect to the first component, and is equipped with a sound-emitting member, a pawl member, and an urging member. The sound-emitting member is mounted non-rotatably to the first component, and on its outer periphery has a number of diametrically jutting jags. The pawl member has a body portion mounted pivotably on the second component; a pawl portion formed to the first-component side of the pivot center of the body portion, for colliding with the jags on the sound-emitting member; and on a side of the body portion astride the pivot center opposite the first-component side, an arcuate contact face whose radius on a first side is smaller than its radius on a second side, with a straight line joining the pivot center and the pawl portion being the dividing line. The urging member at one end is mounted on the second component, nearer the first side of the contact face, and extends from the one end to contact on the contact face, for urging the pawl portion of the pawl member into a collision posture in which it collides with the sound-emitting member.

When the first component rotates relative to the second component in this sounding device, the pawl member pivots by being pressed upon by the sound-emitting member. When the pawl member pivots, the one side or the other side of the pawl member presses on the urging member and the urging member urges the pawl member, returning the pawl member back into its collision posture. The sounding mechanism thereby issues sound by repeatedly colliding with the jags. In the one side or the other side of the contact face pressing on the urging member, Since one side (first side) of the pawl-member contact-face, which is nearer to where the urging member is mounted to the second component, has a smaller radius of curvature than that of the other side (second side), there is less discrepancy in displacement of the urging member between when the first side presses on the urging member and when the second side presses on the urging member. This therefore lessens disparity in urging force of the urging member, which controls fluctuations in tone.

Preferably, the fishing reel is a spinning reel having as the first component a spool shaft which is mounted non-rotatably but axially shiftably to the main body thereof, and as the second component a spool which is mounted on the spool shaft via a drag mechanism. The sound issues due to relative rotation between the spool shaft and the spool. In this case, fluctuations in tone of a sounding device, which issues sound through rotation reciprocal between a spool shaft and a spool in a spinning reel in order to indicate that the drag is operating, can be controlled.

A fishing-reel sounding device in accordance with the second aspect of the invention is the device set forth in the first aspect, wherein the pawl portion is lengthwise formed longer in the rotational-axis direction of the spool than the rest of the pawl member. In this case, since the pawl portion, which contacts the sound-emitting member, is longer lengthwise in the spool axial direction, the pawl portion's range of contact in the spool axial direction is broad. Therefore, sound issues reliably, even though the front-to-rear position of the spool is adjusted in order to, for example, modify the line-winding configuration.

A fishing-reel sounding device in accordance with the third aspect of the invention is the device of the first aspect, wherein the pawl member is in the form of an approximate triangle whose corners are each rounded, with the contact face being formed on an arcuate curve formed between joining first and second corners and the pawl portion being formed at a third corner. These conditions enable constituting the pawl member by a simple conformation.

A fishing-reel sounding device in accordance with the fourth aspect is the device recited in the third aspect, wherein the first corner being located on the first side, while the second corner being located on the second side. Each of the first and second corners is rounded. The first corner is larger in rounding radius than is the second corner. Given these conditions, when the urging member is pressed on by a corner, since the rounding radius of the first corner on the first side is larger, displacement of the urging member with the first side is lessened further.

A fishing-reel sounding device in accordance with the fifth aspect of the invention is the device recited in the first aspect, wherein the urging member is a plate spring formed by bending a spring-plate material. In this case, utilizing a plate spring lets the installation area for the device to be made smaller, to house the sounding device even in a narrow space.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Overall Configuration and Reel Unit Configuration

Figure 1:
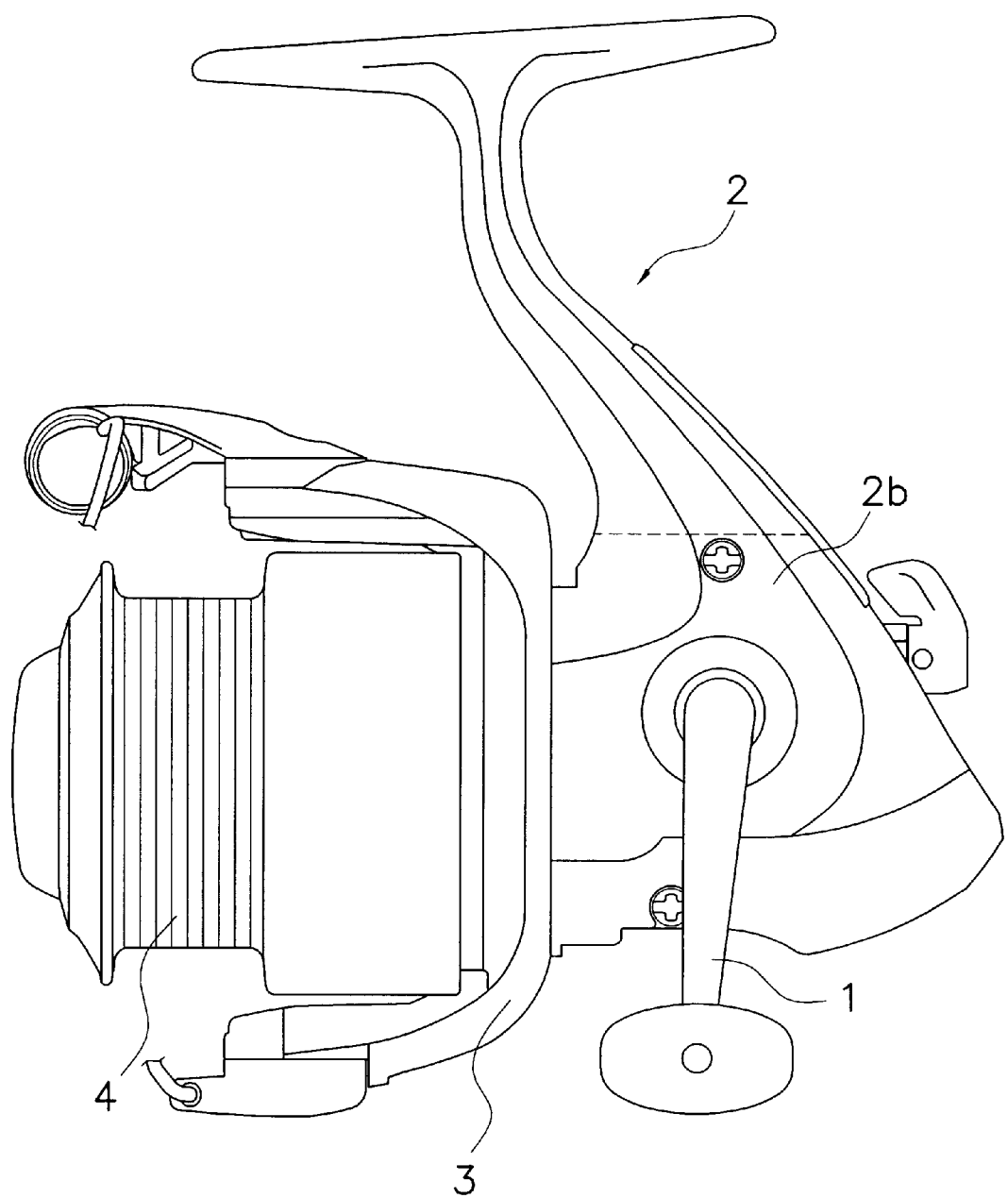
FIG. 1 is a lateral side view of a spinning reel in accordance with an embodiment of the present invention.
Figure 2:
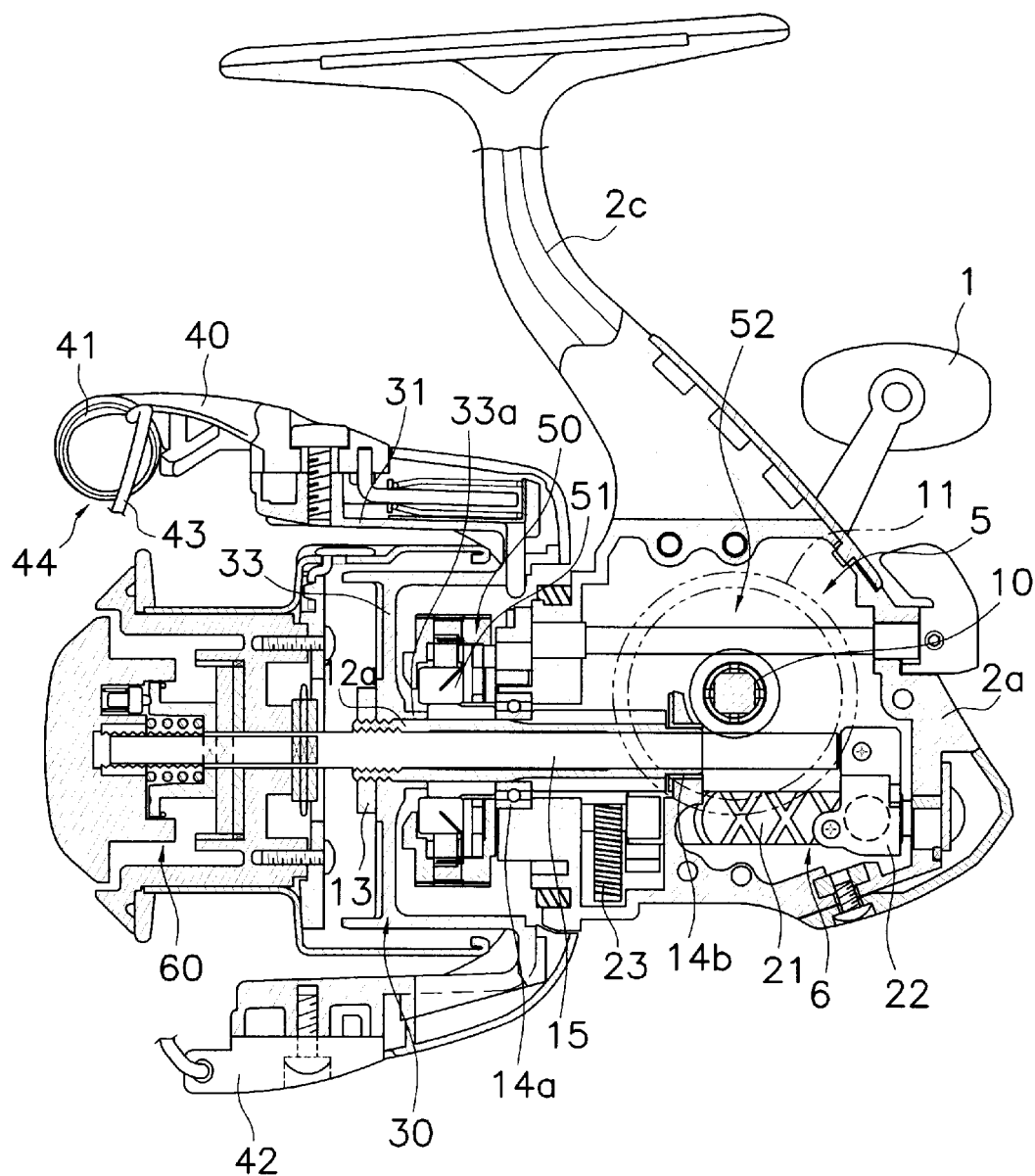
FIG. 2 is a cross-sectional side view of the spinning reel in accordance with the embodiment of the present invention.

As shown in FIGS. 1 and 2, a spinning reel in accordance with an embodiment of the present invention includes a handle 1, a reel unit 2 rotatably supporting the handle 1, a rotor 3, and a spool 4. The rotor 3 is for winding the fishing line around the spool 4, and is rotatably supported at the front of the reel unit 2. The fishing line is wound around the outer peripheral surface of the spool 4, which is disposed at the front of the rotor 3 and can be shifted back and forth. It should be noted that the handle 1 can be attached to the left side of the reel unit 2 as shown in FIG. 1, or to the right side of the reel unit 2 as shown in FIG. 2.

The reel unit 2 includes a reel body 2a provided with an aperture, a lid member 2b mounted detachably to the reel body 2a so as to shut that aperture, and a rod-attachment leg 2c extending diagonally up/frontward from the lid member 2b. In the interior of the reel body 2a is a hollow space, and installed within the hollow space are a rotor drive mechanism 5 that rotates the rotor 3 in cooperation with rotation of the handle 1, and an oscillating mechanism 6 that shifts the spool 4 back and forth to uniformly wind fishing line onto the spool 4.

The rotor drive mechanism 5 includes a face gear 11 that rotates together with a handle shaft 10 onto which the handle 1 is fastened, and a pinion gear 12 that meshes with the face gear 11. The pinion gear 12 is a tubular member, whose front portion 12a passes through the center portion of the rotor 3. The pinion gear 12 is fastened to the rotor 3 by a nut 13. The mid-portion and the axial rear end of the pinion gear 12 are rotatably supported by the reel unit 2 via respective bearings 14a and 14b.

The oscillating mechanism 6 is a device for causing a spool shaft 15, which is linked to the center portion of the spool 4 via a drag mechanism 60, to shift back and forth, thereby shifting the spool 4 in the same direction. The oscillating mechanism 6 has a worm 21 disposed below and parallel to the spool shaft 15, a slider 22 that moves back and forth along the worm 21, and an intermediate gear 23 affixed to the front end of the worm 21. The rear end of the spool shaft 15 is non-rotatably affixed to the slider 22. The intermediate gear 23 meshes with the pinion gear 12 via a (not illustrated) gear-down train. Thus, the speed with which the oscillating mechanism 6 shifts back and forth is slowed down, and the fishing line can be wound densely onto the spool 4.

Rotor Configuration

The rotor 3, as shown in FIG. 2, includes a cylindrical portion 30, and first and second rotor arms 31 and 32 opposing each other and furnished on the sides of the cylindrical portion 30. The cylindrical portion 30 and the two rotor arms 31 and 32 are made of, for instance, a synthetic polymer, and are formed as a one-piece unitary member.

A front wall 33 is provided at the front portion of the cylindrical portion 30. A boss portion 33a is formed in the middle of the front wall 33. A through-hole is formed in the center of the boss portion 33a, and the front portion 12a of the pinion gear 12 and the spool shaft 15 pass through this through-hole. The nut 13 is arranged at the front portion of the front wall 33.

The first rotor arm 31, curving in an outward bulge, extends frontward from the cylindrical portion 30, and the part joined with the cylindrical portion 30 is curved broadening in the circumferential direction of the cylindrical portion 30. A first bail-support member 40 is fitted pivotably onto the outer peripheral side of the front end of the first rotor arm 31. A line roller 41 for guiding fishing line onto the spool 4 is fitted to the front end of the first bail-support member 40.

The second rotor arm 32, curving in an outward bulge, extends frontward from the cylindrical portion 30. The second rotor arm 32 branches into two legs from its tip toward the cylindrical portion 30, such that the second rotor arm 32 is connected to the cylindrical portion 30 in two places that spaced at a circumferential interval. A second bail-support member 42 is fitted pivotally onto the outer peripheral side of the front end of the second rotor arm 32.

A bail 43, which is a wire bent approximately into U-shaped, is fixedly coupled between the line roller 41 and the second bail-support member 42. These first and second bail-support members 40 and 42, the line roller 41, and the bail 43 compose a bail arm 44 that guides fishing line onto the spool 4. The bail arm 44 is pivotable between a line-guiding posture, indicated in FIG. 2, and, when flipped over, a line-releasing posture.

An anti-reverse mechanism 50 for blocking and releasing reverse rotation of the rotor 3 is provided inside the cylindrical portion 30 of the rotor 3. This anti-reverse mechanism 50 has a roller-type one-way clutch 51 with a freely rotating inner ring, and a switching mechanism 52 that switches the one-way clutch 51 between an operating state, in which reverse rotation is blocked, and a non-operating state, in which reverse rotation is allowed.

Spool Configuration

Figure 3:
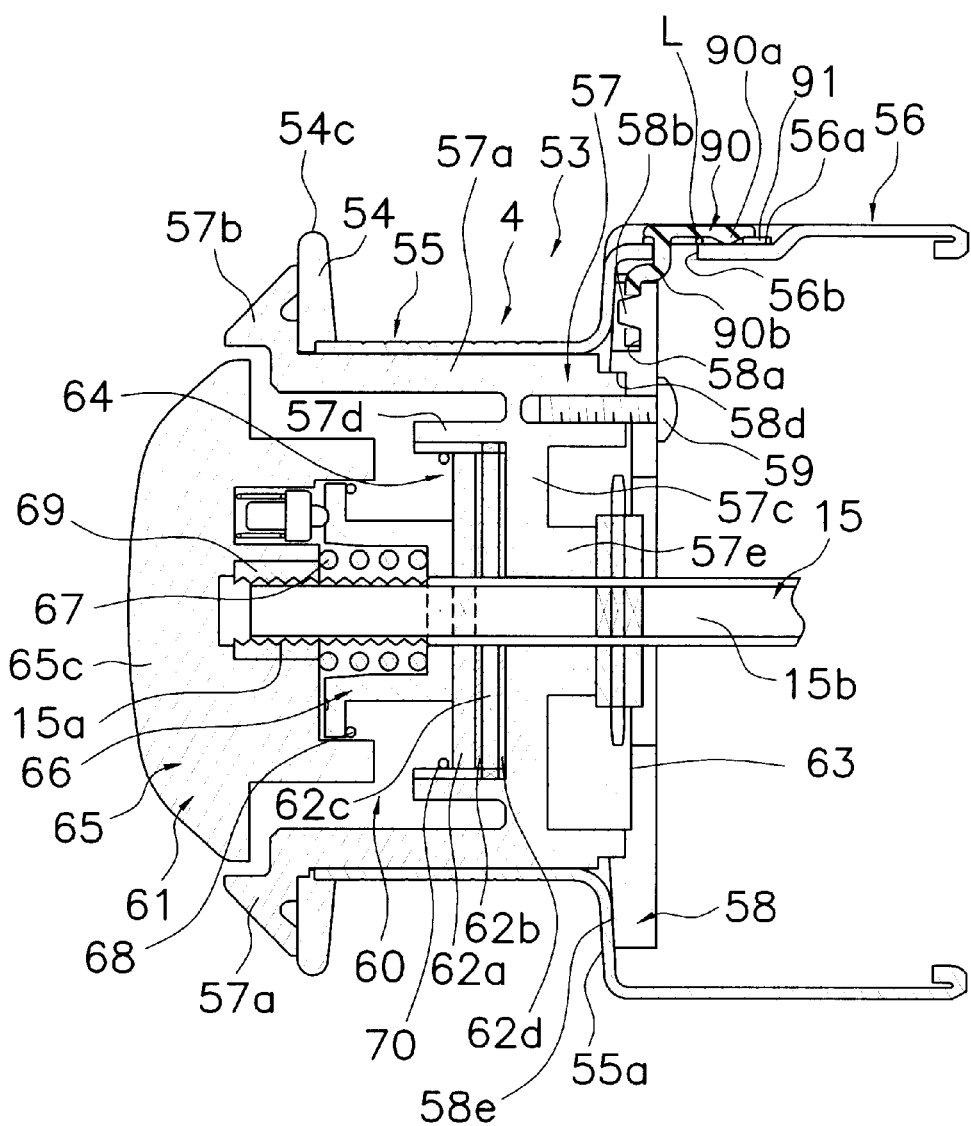
FIG. 3 is an enlarged cross-sectional view of a spool section of the spinning reel in accordance with the embodiment of the present invention.
Figure 4:
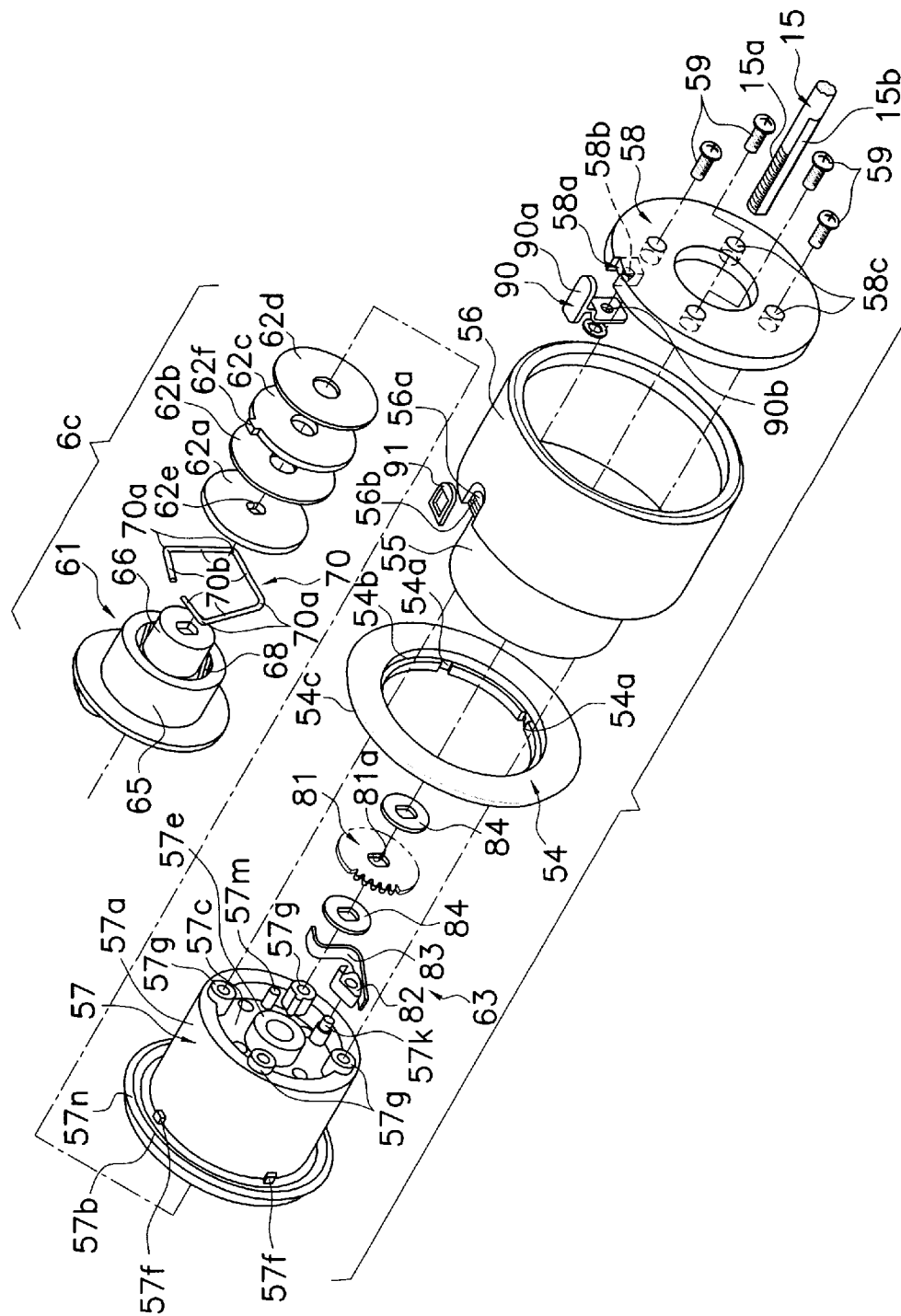
FIG. 4 is an exploded perspective view of the spool in accordance with the embodiment of the present invention.

The spool 4 is arranged between the first rotor arm 31 and the second rotor arm 32 of the rotor 3, and is fastened to the front end of the spool shaft 15 with the drag mechanism 60 interposed between the spool shaft 15 and the spool 4. As shown in FIGS. 3 and 4, the spool 4 includes a spool body 53, and a front flange portion 54 that is attached to the front end of the spool body 53.

The spool body 53 includes: a tubular bobbin trunk portion 55 onto the outer periphery of which fishing line is wound; a larger-diameter tubular skirt portion 56 formed unitarily with the rear end of the bobbin trunk portion 55; an insert member 57 inserted into the bobbin trunk portion 55; and a fastening member 58 that fastens the bobbin trunk portion 55 to the insert member 57.

The bobbin trunk portion 55 and the skirt portion 56 are a tubular member with large-diameter and small-diameter dual-stage components. The bobbin trunk portion 55 and the skirt portion 56 are obtained by press-working. In other words, the bobbin trunk portion 55 and the skirt portion 56 are made of a thin sheet of aluminum alloy and are formed in substantially unitary thickness. The bobbin trunk portion 55 has a rear flange portion 55a, which extends radially outward and is connected to the skirt portion. The fastening member 58 is disposed on the rear surface of the rear flange portion 55a.

The skirt portion 56 is folded over at its rear end for reinforcement. A mounting cavity 56a for mounting a line holder 90 is formed on the front portion of the peripheral surface of the skirt portion 56. The mounting cavity 56a is provided with a through-hole 56b through which the line holder 90 passes.

Figure 5:
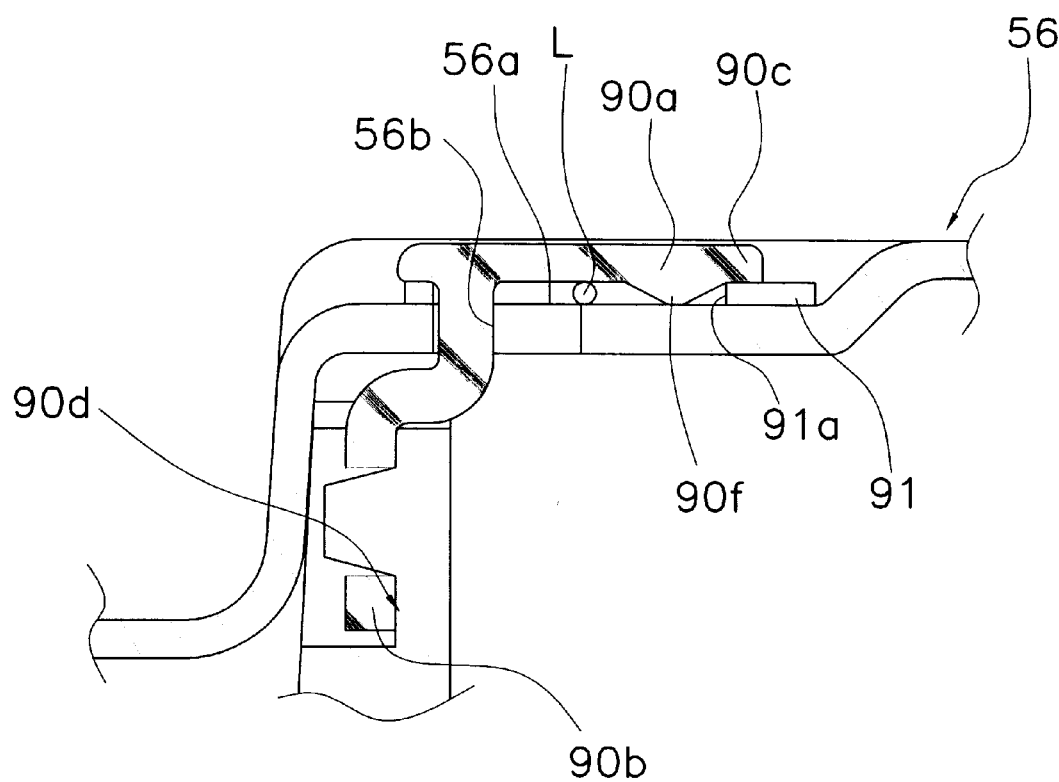
FIG. 5 is an enlarged cross-sectional view of a line holder and environs of the spool in accordance with the embodiment of the present invention.
Figure 6:
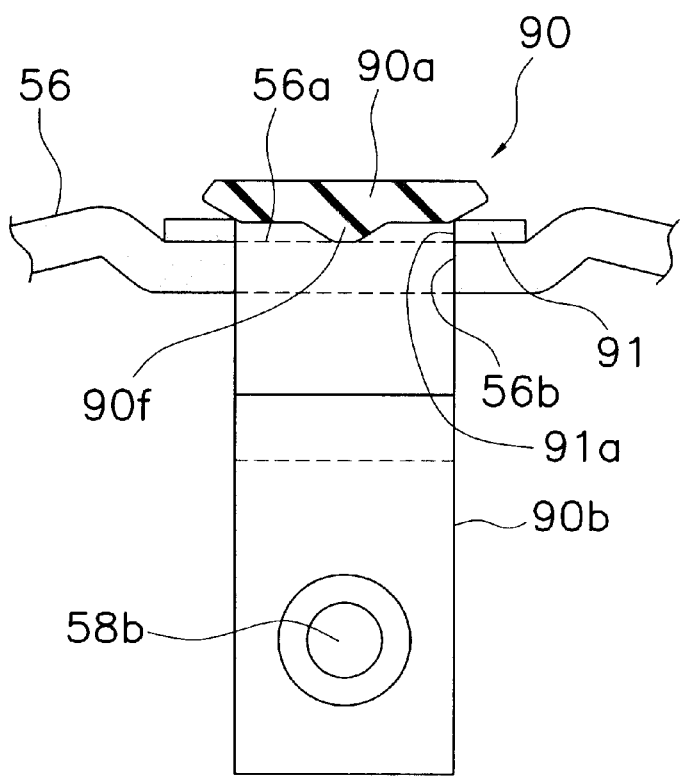
FIG. 6 is an enlarged cross-sectional view of the line holder and environs of the spool in accordance with the embodiment of the present invention.

The line holder 90 has, as shown enlarged in FIGS. 5 and 6, a lock portion 90a that is furnished so as to be outwardly exposed and to face an outer periphery of the mounting cavity 56a, and a mounting portion 90b that is bent at approximately a right angle from the lock portion 90a and penetrates the through-hole 56b to extend to the interior of the skirt portion 56. The lock portion 90a and the mounting portion 90b of the line holder 90 are formed integrally from an elastically deformable synthetic resin polymer.

The lock portion 90a, which is for locking the fishing line L by nipping it together with the outer peripheral surface of the skirt portion 56, has an end portion 90c that extends rearward. Likewise, the lock portion 90a is formed with a protrusion 90f that protrudes heading against the skirt portion 56. The protrusion 90f is formed in a bulging contour that heads against the skirt portion 56, such that the tip portion of the protrusion 90f abuts on the skirt portion 56. Furthermore, in between the lock portion 90a and the mounting cavity 56a of the skirt portion 56 also includes a spacer member 91 having a hollow 91a, into a center portion of which the protrusion 90f fits.

The mounting portion 90b is attached to a line-holder mounting portion 58a formed in the fastening member 58. The line-holder mounting portion 58a is a recess formed on an outer circumferential portion of the front portion of the fastening member 58. The line-holder mounting portion 58a is provided with a frustum-shaped protrusion 58b onto which the line holder 90 is mounted.

With a spool 4 of this sort, the leading-end part of the fishing line L is locked in the line holder 90 after the fishing line L is wound onto the spool 4.

In locking the fishing line L into the line holder 90, the end portion 90c of the lock portion 90a is lifted up to create a gap in between the protrusion 90f and the mounting cavity 56a of the skirt portion 56. Nipping the fishing line L deeply through the gap locks the fishing line L in the lock portion 90a.

Herein, since the protrusion 90f is formed on the lock portion 90a, fishing line L locked in the lock portion 90a is kept from shifting toward the end portion 90c of the lock portion 90a. Accordingly, furnishing a protrusion 90f of this sort keeps the fishing line L from coming undone. As a result, the fishing line can be locked securely.

As shown in FIGS. 3, 4, 7, and 8, the insert member 57 is inserted into the bobbin trunk portion 55 and accommodates the drag mechanism 60. The insert member 57 is a tubular component that is made of a synthetic polymer and is formed by, for example, injection molding. The insert member 57 includes: an outer tubular portion 57a mounted to the bobbin trunk portion 55; a larger-diameter flange-fastening portion 57b formed at the front end of the outer tubular portion 57a; a wall portion 57c formed inward from the outer tubular portion 57a; an inner-tubular portion 57d protruding frontward from the wall portion 57c on the inner side of the outer tubular portion 57a; and a tubular shaft-supporting portion 57e formed protruding rearwards from an inner portion of the wall portion 57c.

Figure 9:
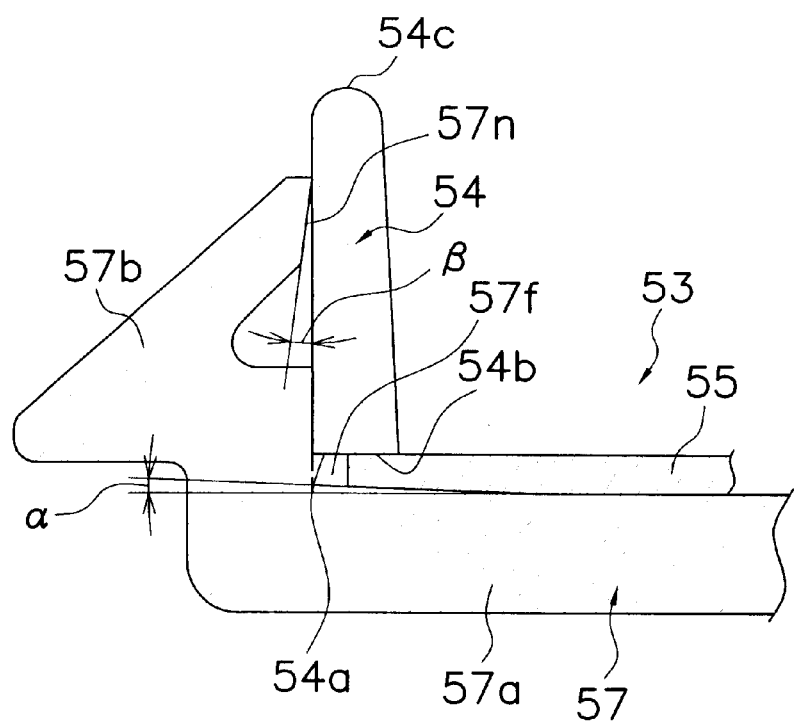
FIG. 9 is an enlarged cross-sectional view of a fore-end portion of the spool in accordance with the embodiment of the present invention.

At the foot part of the flange-fastening portion 57b, which is formed on the front of the outer tubular portion 57a, four circumferentially spaced turn-stop nubs 57f for stopping the front flange portion 54 against turning are formed. Notches 54a into which the turn-stop nubs 57f interlock are formed along the inner periphery of the front flange portion 54 at its front. Furthermore, as shown in FIG. 9, the outer peripheral surface at the front of the outer tubular portion 57a is a tapered surface that flares frontward. The flare angle a is, e.g., in the range of one to five degrees. Forming the tapered surface in this range allows the bobbin trunk portion 55, which is made of thin metal, to be pressure-inserted into the outer tubular portion 57a. In this manner, gaps between the bobbin trunk portion 55 and the outer tubular portion 57a are eliminated, preventing fishing line from getting pinched in between them.

The flange-fastening portion 57b is provided in order to clamp the front flange portion 54 to the bobbin trunk portion 55. The rear surface of the flange-fastening portion 57b is provided with a tapered surface 57n, such that it contacts the front surface of the flange portion 54 at a predetermined intersection angle β. Forming the tapered surface 57n in this way eliminates gaps between the flange-fastening portion 57b and the front flange portion 54, thereby preventing fishing line from getting pinched and at the same time improving the appearance.

Along the outer periphery of the wall portion 57c rear face, four rearward-jutting attachment bosses 57g are formed spanning the outer tubular portion 57a. Attachment bolts 59 are screwed into these attachment bosses 57g, fastening the bobbin trunk portion 55 and the skirt portion 56 to the insert member 57. The wall portion 57c is further provided with a spring lock portion 57m and a mounting boss 57k for mounting a (later-described) first sounding mechanism 63 in the drag mechanism 60.

The inner-peripheral margin of the inner-tubular portion 57d serves as a cavity 64 for accommodating the drag mechanism 60, and on the inner-peripheral surface thereof, a pair of first interlock-grooves 57h for checking rotation of the drag mechanism 60 is formed. The first interlock-grooves 57h have a rectangular cross section, and are formed parallel to the spool shaft 15 in radially opposing positions. The inner-peripheral surface of the inner-tubular portion 57d is further provided with four circumferentially spaced second interlock-grooves 57i for retaining the drag mechanism 60. The second interlock-grooves 57i are formed to be substantially semi-circular in cross-section by boring, through the wall-portion 57c end, round holes along the inner peripheral surface (the outer rim of the cavity 64) that penetrate the wall portion 57c and parallel the spool shaft 15. The second interlock-grooves 57i are formed only up to just short of the front-end face of the inner-tubular portion 57d. A retaining member 70, which will be described below, interlocks with edges 57j, which are formed along the front-end face of the inner-tubular portion 57d.

Referring to FIGS. 3–4, the fastening member 58, which is a circular plate component made of a synthetic polymer, is formed with four through-holes 58c through which the attachment bolts 59 pass. Likewise, the fastening member 58 is formed with a stepped recess 58d centered on the rear-end face of the insert member 57. A pressing surface 58e that slightly slopes convexly frontward to match the slope of the rear flange portion 55a is formed on the front side of the fastening member 58. By means of the attachment bolts 59, the fastening member 58 is mounted to and centered on the rear face of the insert member 57. Also, the bobbin trunk portion 55 is fixed to the insert member 57 by the pressing surface 58e pressing against the rear flange portion 55a. The front flange portion 54 is pressed by the bobbin trunk portion 55 toward the flange-fastening portion 57b, fixing the front flange portion 54.

Figure 7:
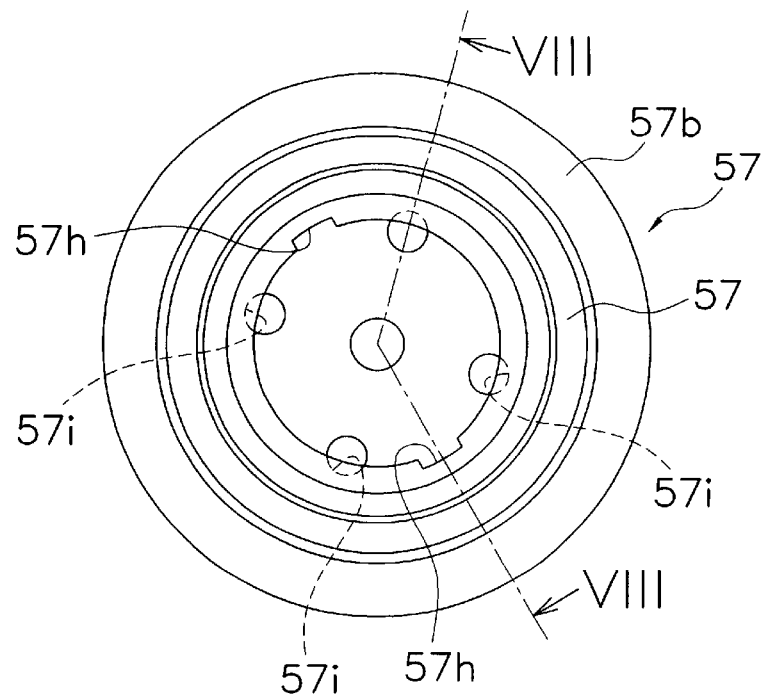
FIG. 7 is an elevational front view of the spool in accordance with the embodiment of the present invention.
Figure 8:
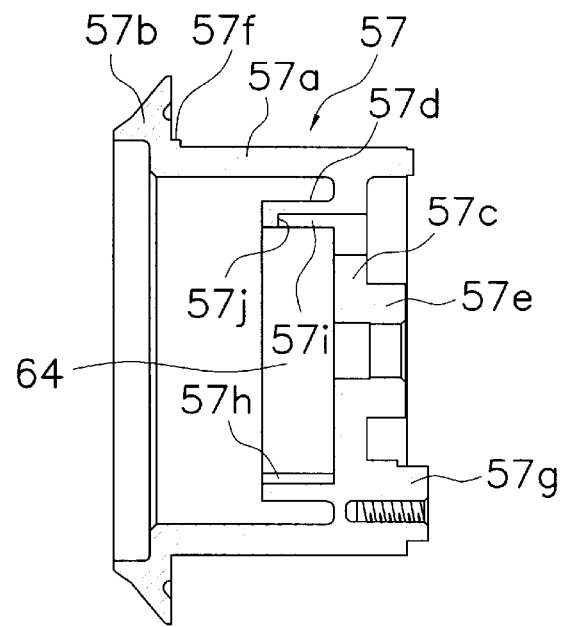
FIG. 8 is a cross-sectional of the spool shown in FIG. 7 viewed along the arrow VIII—VIII.

The front flange portion 54, an annular component made of, for example, an aluminum alloy, is formed from a sheet-metal plate, by punching out, press-working, and then cutting. The outer peripheral surface 54c of the front flange portion 54 is rounded by machining to be circular seen in cross-section as shown in FIG. 7. Formed in the inner peripheral surface of the front flange portion 54 are the notches 54a mentioned above, and an annular abutment recess 54b that is formed so that the front-edge face of the bobbin trunk portion 55 will abut on the rear face along the notches 54a. The notches 54a and the abutment recess 54b are formed simultaneously during the punching process. The front flange portion 54 is fastened to the insert member 57 by the fastening of the bobbin trunk portion 55 and the skirt portion 56 to the insert member 57. That is, in being fastened to the insert member 57, the bobbin trunk portion 55 is compressed toward the front flange portion 54, thereby clamping the front flange portion 54 to fix it between the bobbin portion 55 and the flange-fastening portion 57b.

Drag Mechanism Configuration

The drag mechanism 60, a device for applying drag force to the spool 4 by braking rotation of the spool 4 in the line reel-out direction is as shown in FIGS. 3 and 4. The drag mechanism 60 is disposed inside the cavity 64 in the inner-tubular portion 57d of the insert member 57. The drag mechanism 60 includes a drag knob 61 that is screwed to the front end of the spool shaft 15; four, for example, drag disks 62a to 62d that are pressed together by the drag knob 61; and a first sounding mechanism 63 that issues sound when the drag is operating.

Figure 10:
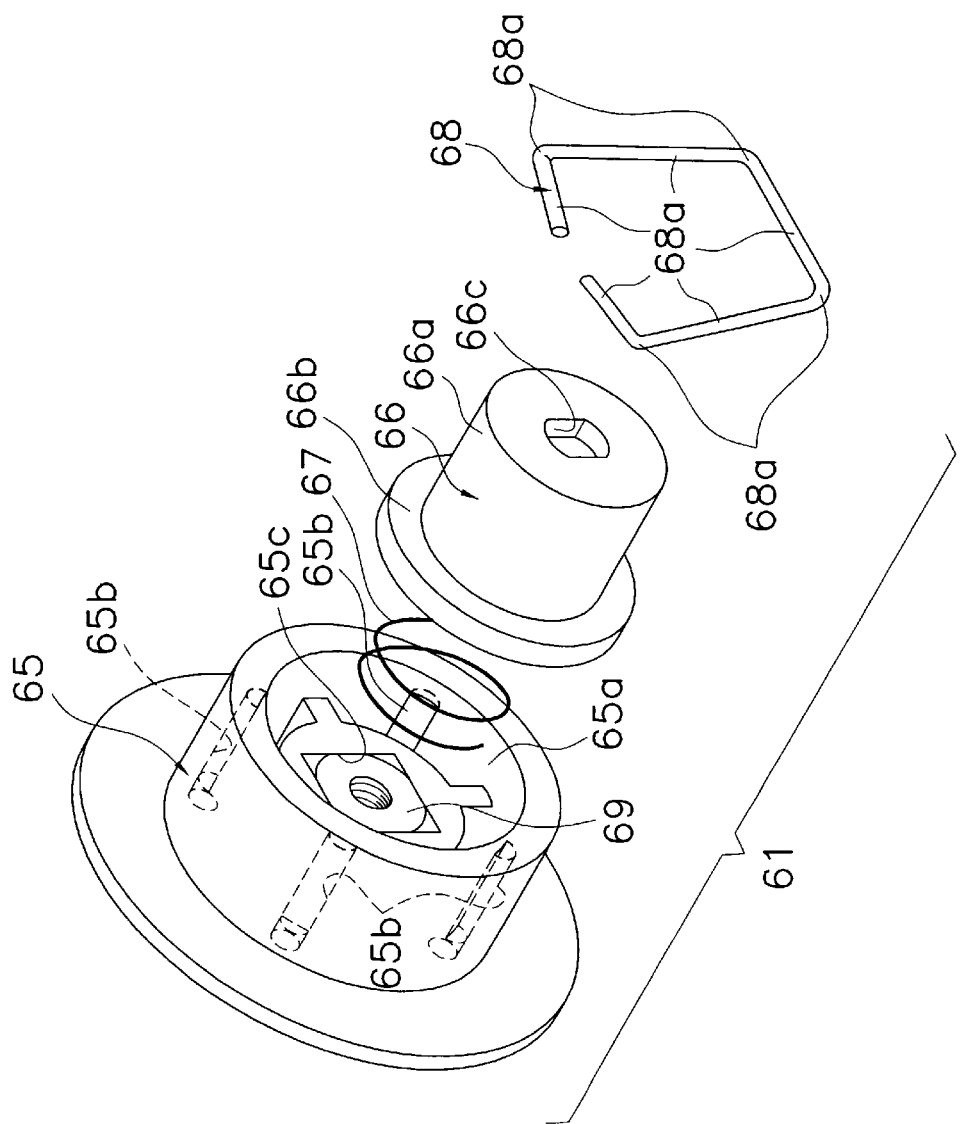
FIG. 10 is an exploded oblique view of the drag knob in accordance with the embodiment of the present invention.
Figure 11:
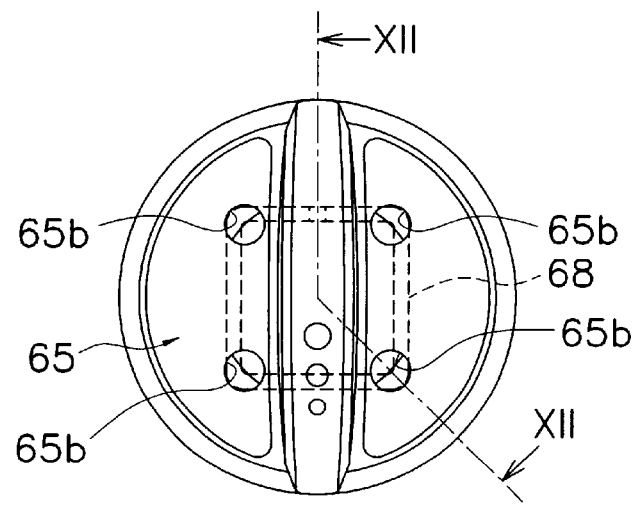
FIG. 11 is an elevational front view of the drag knob in accordance with the embodiment of the present invention.
Figure 12:
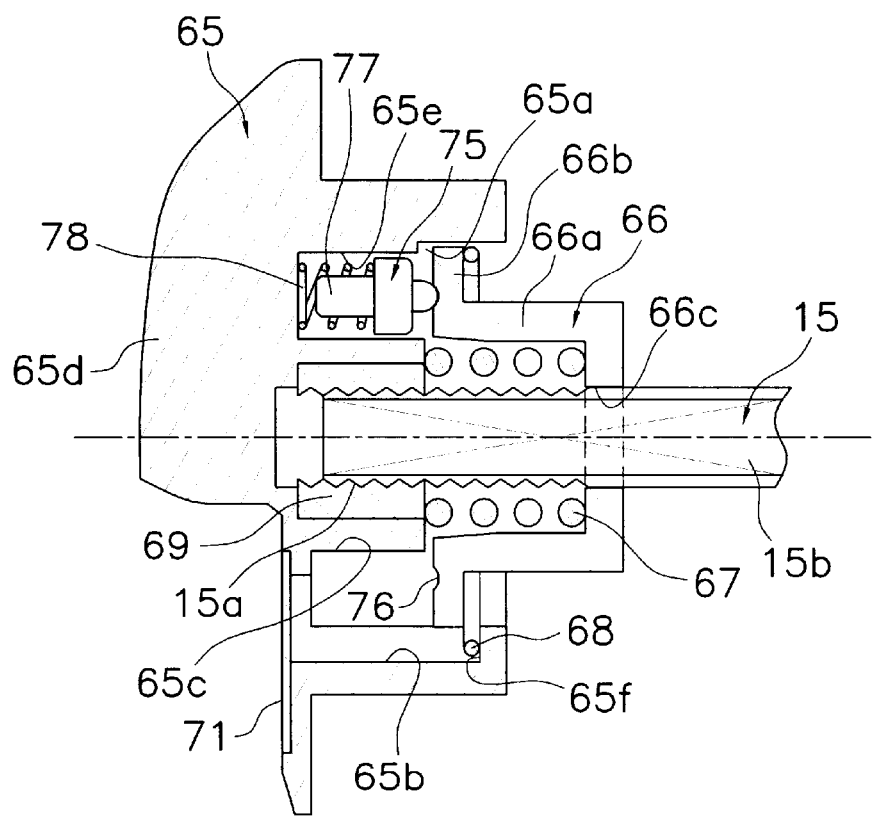
FIG. 12 is a cross-sectional view of the drag knob shown in FIG. 11 viewed along the arrow XII—XII.

As shown in FIGS. 10 to 12, the drag knob 61 includes: a knob unit 65 for performing a manual drag-force adjusting operation; a presser unit 66 pressed on by the knob unit 65; a coil spring 67 arranged between the knob unit 65 and the presser unit 66; a retaining member 68 for retaining the presser unit 66 with respect to the knob unit 65; and a second sounding mechanism 75 that produces a sound when the drag is adjusted.

The knob unit 65, which is a brimmed, synthetic-polymer manufactured cylindrical component formed by, e.g., injection molding, has a circular cavity 65a opening on the rear-end face, and four, for example, circumferentially spaced interlock grooves 65b formed from the front-end face through the cavity 65a sleeve to just short of the rear-end face, and paralleling the spool shaft direction. The interlock grooves 65b are shaped semi-circularly in the cavity 65a sleeve from round holes bored through the front-end face, and are formed to just short of the rear end of the cavity 65a. The retaining member 68 interlocks with formed edges 65f of the interlock grooves 65b. The round holes for forming the interlock grooves 65b are hidden by a seal 71 that is glued to the front surface of the knob unit 65. Shutting off the round holes in this way by gluing on the seal 71 keeps water or other foreign matter from entering the inside, even where the interlock grooves 65b are formed from round holes in order to die-cast.

Formed in the center of the knob unit 65 is a nut-mounting portion 65c into which a quadrangular nut 69 is fitted non-rotatably but permitted to shift axially. An approximately trapezoidal-shaped knob protrusion 65d is formed diametrically along the front portion of the knob unit 65. A mounting hole 65e for accommodating the second sounding mechanism 75 is formed in the rear surface of the knob unit 65. The nut 69 is screwed to a male-threaded portion 15a formed in the front end of the spool shaft 15. The coil spring 67 is mounted in its compressed state between the nut 69 and the presser unit 66.

The presser unit 66 is a component permitted to rotate but retained in the axial direction in being coupled to the knob unit 65, and is not rotatable with respect to the spool shaft 15. The pressing force on the drag disks 62a to 62d of the presser unit 66 contacting the rear end of the coil spring 67 varies in accordance with variation in the spring force of the coil spring 67. The presser unit 66, a brimmed tubular component having a base, includes a cylindrical portion 66a and a ring-shaped brim portion 66b whose diameter is larger than that of the cylindrical portion 66a. An oblong-groove-contoured interlock hole 66c, into which chamfered portions 15b formed paralleling each other at the front end of the spool shaft 15 interlock non-rotatably, is formed in the inner margin of the cylindrical portion 66a. The coil spring 67 is accommodated inside the cylindrical portion 66a. A number of semi-spherical sound-emitting depressions 76 are formed ranged in the circumferential direction in the front surface of the brim portion 66b. The presser unit 66 is linked with the knob unit 65 by the retaining member 68.

The coil spring 67 is mounted in its compressed state between the nut 69 and the presser unit 66. More specifically, guided by the cylindrical portion 66a of the presser unit, the coil spring 67 is disposed so that it touches the nut 69 and the bottom portion of the cylindrical portion 66a.

The retaining member 68 is a component formed by bending a metal piece of wire having elasticity. The retaining member 68 is formed so that it is compressed and becomes quadrangular when mounted, and so that it widens slightly when not mounted. The corner portions 68a of this quadrangular interlock with the formed edges 65f of the interlock grooves 65b, while the contact portions 68b linking the corner portions 68a contact the presser unit 66 on the rear side of the brim portion 66b. The presser unit 66 is thereby housed in the cavity 65a while being retained against coming out.

The second sounding mechanism 75 includes the sound-emitting depressions 76 in the presser unit 66, a sound-emitting pin 77 mounted in the mounting hole 65e, and a coil spring 78 that urges the sound-emitting pin 77 towards the sound-emitting depressions 76. The sound-emitting depressions 76 are formed numerously, spaced in the circumferential direction in a locus wherein they are opposable with the mounting hole 65e. The center portion of the sound-emitting pin 77 has a large diameter whereas its tip and rear end have a small diameter, and the tip of the sound-emitting pin 77 is rounded into a semi-sphere. When the knob unit 65 and the presser unit 66 are rotated against one another to adjust the drag, repeated collision of the sound-emitting pin 77 with the sound-emitting depressions 76 issues sound.

As shown in FIG. 4, drag disk 62a, a disk-shaped component made of metal, is in contact with the presser unit 66, and is non-rotatable with respect to the spool shaft 15. Drag disk 62b, a disk-shaped component made of, e.g., felt, is rotatable with respect to the spool 4 and the spool shaft 15. Drag disk 62c, a disk-shaped component made of metal, is non-rotatable with respect to the spool 4. And drag disk 62d, a disk-shaped component made, e.g., of felt, is free to rotate with respect to the spool 4 and the spool shaft 15. An oblong-groove-contoured interlock hole 62e, into which the chamfered portions 15b of the spool shaft 15 engage, is formed in the center of drag disk 62a. A pair of radially outward protruding ear portions 62f that interlock with the first interlock-grooves 57h of the spool 4 is formed on the outer circumferential surface of drag disk 62c. Thus, the drag disk 62c is made non-rotatable with respect to the spool 4.

The front side of the drag disk 62b is in contact with the retaining member 70. The retaining member 70 is quadrangular like the retaining member 68, and its corner portions 70a interlock with the formed edges 57j of the second interlock-grooves 57i, whereas its contact portions 70b are in contact with drag disks 62a to 62d, wherein drag disks 62a to 62d are retained. Accordingly, drag disks 62a to 62d are kept from dropping out even when the drag knob 61 is removed.

Figure 13:
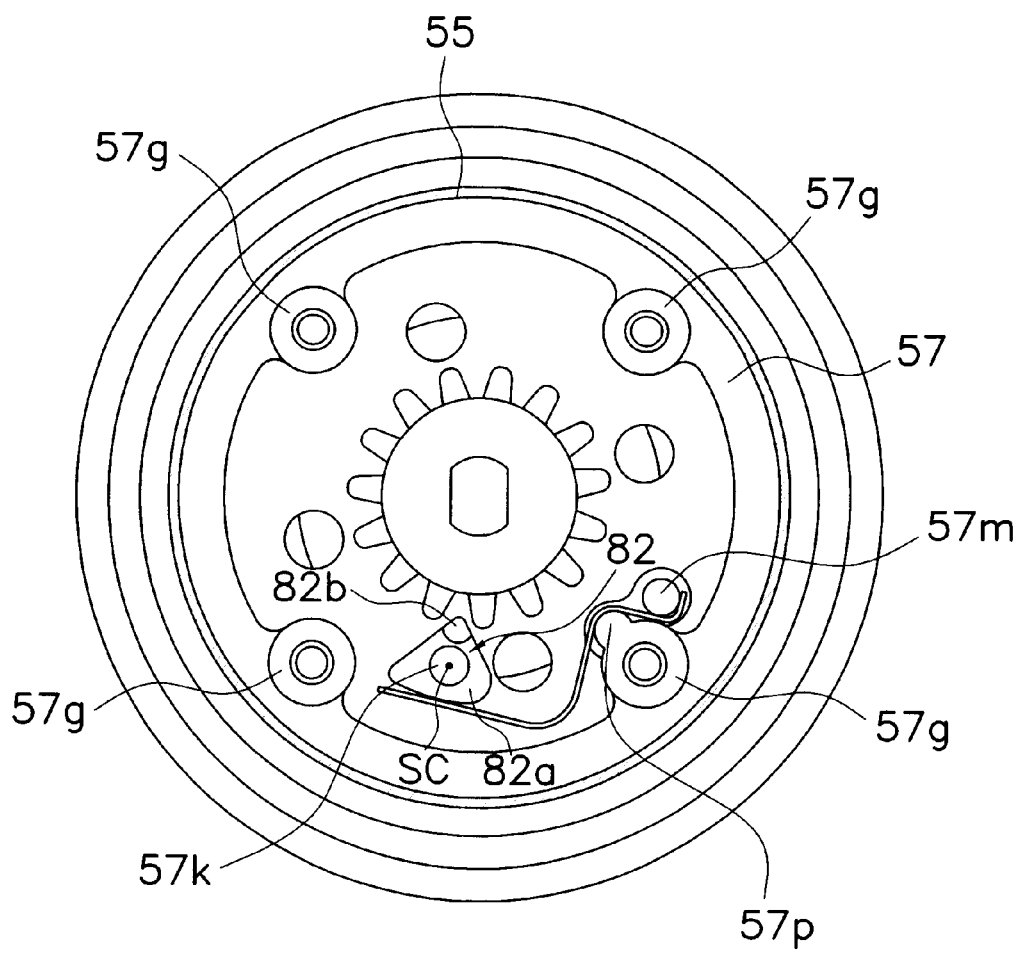
FIG. 13 is a plan view of a first sounding mechanism disposed on a backside of the spool in accordance with the embodiment of the present invention.

The first sounding mechanism 63 issues sound when the spool shaft 15 and the spool 4 are rotated against one another under working of the drag. As shown in FIGS. 3, 4 and 13, the first sounding mechanism 63 includes: a sound-emitting member 81 that is mounted non-rotatably to the spool shaft 15; a pawl member 82 that is mounted pivotably to the insert member 57 and that repeatedly collides with the sound-emitting member 81; and a plate spring 83 that urges the pawl member 82.

The sound-emitting member 81 has an oblong-groove-contoured interlock hole 81a into which the chamfered portions 15b of the spool shaft 15 interlock, and is a gear-shaped disk component having on its outer periphery a number of radially jutting, circumferentially spaced jags 81b. Spool washers 84 for adjusting the horizontal position of the spool 4 are mounted on both sides of the sound-emitting member 81. The spool washers 84 are mounted non-rotatably to the spool shaft 15, and by varying the number of spool washers 84 to change the back-to-front position of the spool 4, the contour of how the line winds onto the spool 4 can be adjusted freely.

Figure 14:
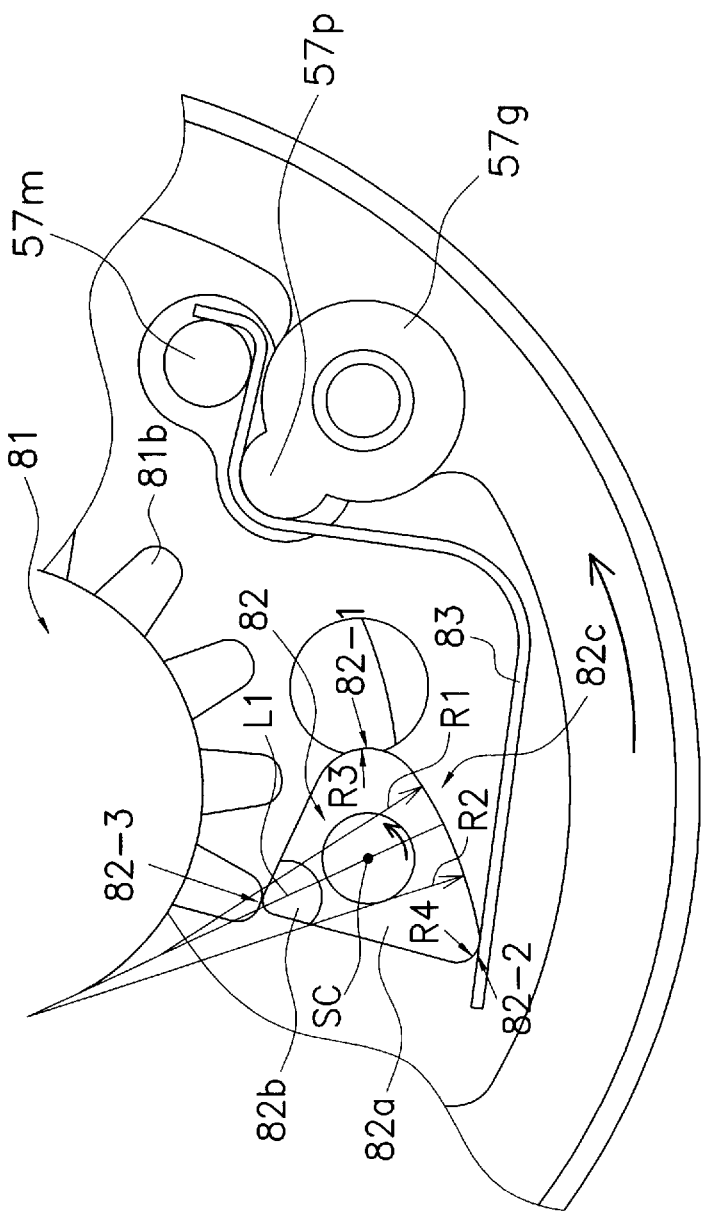
FIG. 14 is an enlarged fragmentary view of the first sounding mechanism in accordance with the embodiment of the present invention.

As shown in FIG. 14, the pawl member 82 is an approximately triangular member having three corners 82-1 (first corner), 82-2 (second corner), and 82-3 (third corner). The paw member 82 includes: a body portion 82a mounted pivotably to the insert member 57 of the spool 4; a pawl portion 82b that collides with the jags 81b on the sound-emitting member 81; and a contact face 82c that contacts the plate spring 83. The pawl portion 82b is formed on the spool-shaft 15 end of the body portion 82a beyond its swing center SC. The length of the pawl portion 82b is formed longer in the spool shaft direction than the rest of the pawl member 82. The contact face 82c is formed circularly arc-shaped on the body portion 82a, astride the swing center SC on the end opposite the spool-shaft 15 end. As seen in FIG. 14, when the pawl member 82 is divided with a straight line L1 that joins the swing center SC and the pawl portion 82b, a radius R1 (first radius of curvature) of the contoured circular arc on a first side (right hand side in FIG. 14) is smaller than a radius R2 (second radius of curvature) on a second side (left hand side in FIG. 14). The corner portions on either side of the contact face 82c are rounded. The corner on the first side has a radius of curvature R3 is larger than a radius of curvature R4 on the second side.

The plate spring 83, which is mounted to the insert member 57 by being clamped between the spring lock portion 57m and one of the attachment bosses 57g, contacts the body portion 82a at a portion where the body portion 82a curves at different curvatures. In this manner, the plate spring 83 urges the pawl member 82 toward the sound-emitting member 81, such that the pawl member 82 is brought into the greatest contact with the sound-emitting member 81. More specifically, the pawl member 82 is disposed such that the corner portion with the larger radius (first corner) is positioned closer to the point where the plate spring 83 is mounted to the insert member 57.

The plate spring 83 is a plate-like component made of metal bent backwards to zigzag at three points. The end of the plate spring 83 nearer the first side of the contact face 82c is mounted on the insert member 57 of the spool 4. More specifically, the plate spring 83, sandwiched in the boundary area between the spring lock portion 57m and the mounting boss 57g, is bent over a nub 57p formed on the mounting boss 57g, then is bent backwards to contact the contact face 82c from the first side. Then the plate spring 83 urges the pawl portion 82b of the pawl member 82 into a collision posture, in which the pawl portion 82b collides with the sound-emitting member 81. In particular, there is a boundary section along the contact face 82c lying on the straight line L1, where the distance from the swing center SC is shortest. The distance between the contact face 82c and the swing center SC becomes greater on either the first side or the second side of the line L1. The distance becomes greater by a greater proportion on the second side than on the first side, inasmuch as the radius R1 is shorter than radius R2, and radius R3 is greater than the radius R4. Therefore, when pressed on by the contact face 82c of the pawl member 82, the plate spring 83 thus urging the pawl member 82 contacts the contact surface 82c in the boundary section. In this manner, the pawl portion 82b is brought into the collision posture, in which the pawl portion 82b contacts with the sound-emitting member 81.

Figure 15:
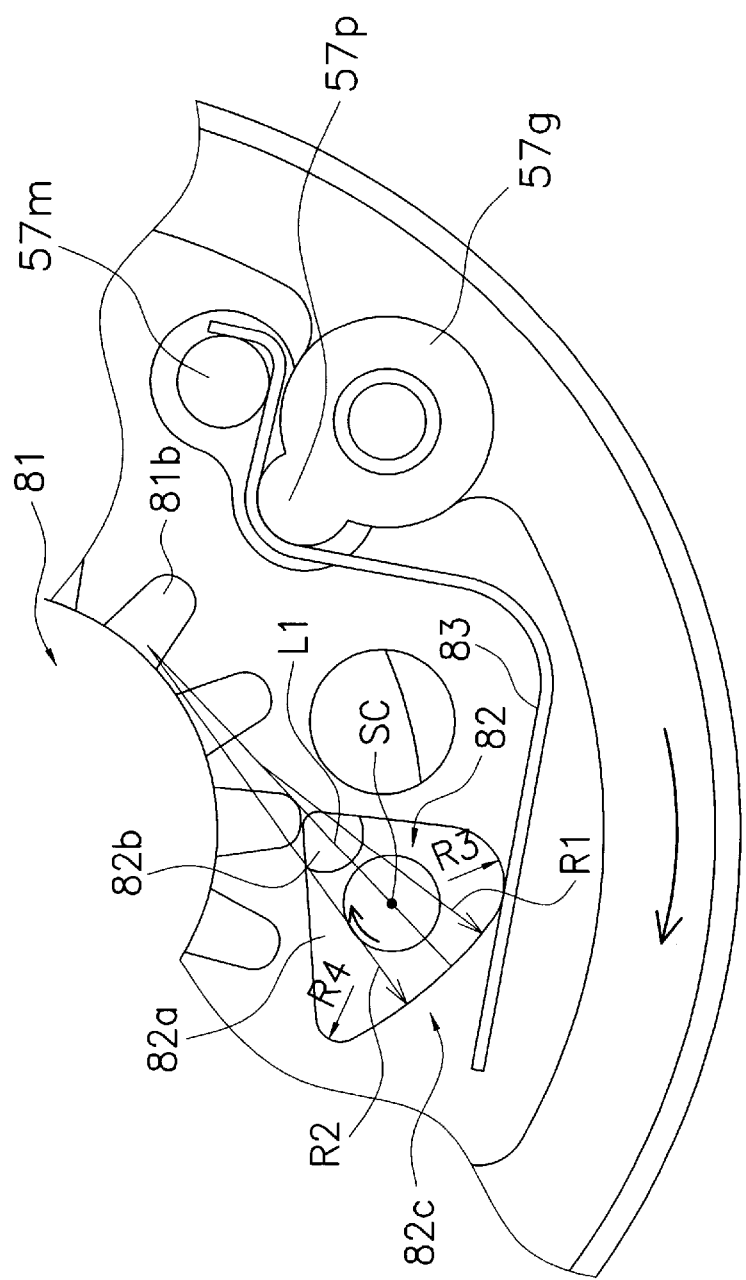
FIG. 15 is an enlarged fragmentary view of the first sounding mechanism in accordance with the embodiment of the present invention.

When the pawl member 82 and the plate spring 83 are arranged in this manner, the force with which the pawl member 82 is pressed toward the sound-emitting member 81 is not liable to fluctuate regardless of the rotation direction of the spool 4. This is because the displacement of the plate spring 83 starts from where the plate spring 83 contacts the nub 57p. If the radii of the curvatures of the contact surface 82c of the pawl member 82 were the same on both sides of line L1, displacement of the plate spring 83 would be greater and therefore urging force from the plate spring 83 would be greater when the pawl member pivots clockwise. In the above-described embodiment, since the radius of curvature of the pawl member 82 is smaller and the rounding radius of the corner is greater on the first side than on the second side, the displacement of the plate spring 83 is lessened when the pawl member 82 pivots clockwise. Accordingly, the amount of displacement of the plate spring 83 and therefore the urging force of the plate spring 83 are substantially the same regardless of whether the pawl member 82 pivots clockwise as shown in FIG. 15, or counterclockwise as shown in FIG. 14. Therefore, variation in sound depending on the rotation direction is not liable to occur. Furthermore, since the pawl portion 82b is elongated in the spool shaft direction, the pawl portion 82b always comes into contact with the sound-emitting member 81, even though the position of the spool 4 is adjusted with the spool washers 84.

Reel Handling and Operation

Before casting, the drag force is adjusted in accordance with the size and species of fish. To adjust the drag force, the drag knob 61 is turned. When the drag knob 61 is turned for example clockwise, then the nut 69, which is screwed to the spool shaft 15, presses the presser unit 66 against the drag disk 62a via the coil spring 67. This increases the drag force. Due to relative rotation between the presser unit 66 and the knob unit 65, the sound-emitting pin 77 in the second sounding mechanism 75 repeatedly collides with the sound-emitting depressions 76 at predetermined intervals, producing a crisp, pleasant clicking sound.

During casting, the bail arm 44 is flipped over to the line-releasing posture. The first bail-support member 40 and the second bail-support member 42 thereby pivot. In this situation, the fishing rod is cast while hooking the fishing line with the index finger of the hand with which the fishing rod is held. The fishing line is then flung out vigorously under the weight of the terminal tackle. When the handle 1 is turned in the line-winding direction, the rotor 3 rotates in the line-winding direction due to the rotor drive mechanism 5, and the bail tripping mechanism restores the bail arm 44 into the line-winding posture, so that the fishing line is wrapped onto the spool 4.

When a fish is caught and the drag is applied, the spool 4 rotates with respect to the spool shaft 15. The first sounding mechanism 63 thereupon issues sound, communicating to the angler that a fish has been caught. The spool 4 spins then in the line reel-out direction with a predetermined drag force. When a sound is produced by the first sounding mechanism 63 while the drag is working, since the spool 4 rotates counterclockwise when viewed from the rear, as shown in FIG. 14, the plate spring 83 contacts the contact face 82c on the second side. Likewise, when the spool 4 is rotated by hand in the line-retrieving direction, the spool 4 rotates clockwise when viewed from the rear, as shown in FIG. 15. In the situations in which the rotation direction of the spool 4 thus differ, the amount of displacement of the plate spring 83 changes depending on the pivoting direction of the pawl member 82. Accordingly, different tones are generated for different rotation directions. In the embodiment of this application, however, inasmuch as the radius of curvature R1 is smaller and the radius of the corner R3 is greater on the first side, which is nearer to the mounting point of the plate spring 83 and where the spring displaces largely with a little amount of pressure, the amount of pressure with respect to the amount of pivot is less on the first side, where the spring displaces largely with a little amount of pressure, than on the second side. Fluctuations in the displacement of the plate spring 83 with respect to the same pivoting amount on the first and the second side are therefore lessened, making the spring force unlikely to fluctuate. The tone is therefore balanced, regardless of the rotation direction of the spool.

Sometimes, prior to fishing, a number of spools 4 onto each of which a different kind of fishing line is wrapped are prepared in advance, and the spool 4 is switched to suit the fishing. To do so, the drag knob 61 is loosened and removed from the spool shaft 15. In this situation, the presser unit 66 is linked to the knob unit 65 by the retaining member 68, so that the presser unit 66 does not fall off from the knob unit 65. Furthermore, the drag disks 62a to 62d are retained by the retaining member 70, so that they do not fall off from the spool 4.

Such retaining members 68 and 70 conventionally were interlocked with annular groove portions formed by a machining process, thus necessitating a machining process for forming these groove portions. However, in the present embodiment, the retaining members 70 and 68 interlock with the interlock-grooves 57i and 65b formed by the die when molding the insert member 57 and the knob unit 65, and therefore machining is unnecessary for the interlocking. This enables processing costs to be reduced.

Other Embodiments (a) In the foregoing embodiment, a plate spring that can be housed compactly was illustrated as an example of an urging means, but the urging force may be provided by a spring in another form apart from a plate spring, such as a coil spring or a torsion coil spring.

(b) In the foregoing embodiment, a spinning-reel sounding mechanism was illustrated as an example, but the fishing reels are not limited to spinning reels, in that the present invention may be applied to sounding mechanism in dual-bearing reels or single-bearing reels.

Under the present invention, in one side or the other side of the contact face pressing on the urging member, the fact that the pawl-member contact-face radius on the one side, nearer the (single-end) mounting side of the urging member, is smaller than on the other side lessens in pivoting the discrepancy between urging member displacement when the one side is pressed upon, and urging member displacement when the other side is pressed upon. This therefore lessens disparity in urging force to control fluctuations in tone.

As used herein, the following directional terms "forward," "rearward," "above," "downward," "vertical," "horizontal," "below", and "transverse" as well as any other similar directional terms refer to those directions of a device equipped with the present invention. Accordingly, these terms, as utilized to describe the present invention should be interpreted relative to a device equipped with the present invention.

The terms of degree such as "substantially," "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Applications No.2002-013292 and 2002-092374. The entire disclosures of Japanese Patent Application No.2002-013292 and 2002-092374 are hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A fishing-reel sounding device for use in a fishing reel, for issuing sound through relative rotation between first and second components of the fishing reel, the second component being rotatable relative to the first component, said fishing-reel sounding device comprising:
   a sound-emitting member mounted non-rotatably to the first component, and having on its outer periphery a number of diametrically jutting jags;
   a pawl member having
      a body portion pivotably mounted on the second component,
      a pawl portion formed on said body portion on a first-component side of a pivot center, said pawl portion being capable of colliding with said jags on said sound-emitting member, and
      an arcuate contact face formed on said body portion on a side of the pivot center opposite from the first component, said contact face being divided into first and second sides by a straight line that joins the pivot center and said pawl portion, said first side having a first radius of curvature that is smaller than a second radius of curvature of said second side; and
   an urging member having a first end that is mounted on the second component, and a second end that contacts and applies urging force to said contact face of said pawl member, such that said pawl portion of said pawl member collides with said sound-emitting member, said first side of said contact face being closer to said first end of said urging member and said second side of said contact face being closer to said second end of said urging member, such that said urging member presses said pawl portion against said sound-emitting member with substantially the same force regardless of a direction in which the second component rotates relative to the first component.

2. The fishing-reel sounding device set forth in claim 1, wherein
   said pawl portion is formed longer than said body portion in a rotational-axis direction of the fishing spool.

3. The fishing-reel sounding device set forth in claim 1, wherein
   said pawl member is in the form of an approximate triangle whose corners are each rounded, with said contact face being on an arcuate curve formed between first and second corners and said pawl portion being formed at a third corner.

4. The fishing-reel sounding device set forth in claim 3, wherein
   said first corner is located on said first side, while said second corner is located on said second side, and
   each of said first and second corners is rounded, said first corner having a larger rounding radius than that of said second corner.

5. The fishing-reel sounding device set forth in claim 1, wherein
   said urging member includes a plate spring formed by bending a spring-plate material.

6. A fishing reel, comprising:
   a handle;
   a reel unit rotatably supporting said handle;
   a rotor rotatably supported at a front of said reel unit, said rotor being rotatable about a spool shaft in cooperation with rotation of said handle;
   a spool disposed at a front of said rotor so as to be shiftable back and forth, such that fishing line can be wound around an outer peripheral surface of said spool as said rotor rotates, and
   a sounding device, including
      a sound-emitting member mounted non-rotatably to said spool shaft, said sound-emitting member having on its outer periphery a number of diametrically jutting jags;

a pawl member having
- a body portion pivotably mounted to said spool,
- a pawl portion formed on said body portion on a sound-emitting member side of a pivot center, said pawl portion being capable of colliding with said jags on said sound-emitting member, and
- an arcuate contact face formed on said body portion on a side of the pivot center opposite from said sound-emitting member, said contact face having first and second corners which are round, said first corner having a larger rounding radius than that of said second corner, an urging member having a first end that is mounted to said spool, and a second end that contacts and applies urging force to said contact face of said pawl member, such that said pawl portion of said pawl member collides with said sound-emitting member, said first corner of said pawl member being closer to said first end of said urging member and said second corner of said pawl member being closer to said second end of said urging member, such that said urging member presses said pawl portion against said sound-emitting member with substantially the same force regardless of a direction in which the second component rotates relative to the first component.

7. The fishing reel set forth in claim 6, wherein said pawl portion is formed longer than said body portion in a rotational-axis direction of said spool shaft.

8. The fishing reel set forth in claim 6, wherein said pawl member is in the form of an approximate triangle whose corners are said first and second corners and a third corner, said third corner defining said pawl portion, and said contact face has a round-arcuate curved line segment between said first and second corners.

9. The fishing reel set forth in claim 8, wherein said contact face is divided into first and second sides by a straight line that joins the pivot center and said pawl portion, said first side having a radius of curvature that is smaller than a radius of curvature of said second side.

10. The fishing reel set forth in claim 9, wherein said first corner is located on said first side, while said second corner is located on said second side.

11. The fishing reel set forth in claim 6, wherein said urging member includes a plate spring formed by bending a spring-plate material.

12. The fishing reel set forth in claim 6, wherein said spool includes
- a bobbin trunk portion onto which fishing line is wound,
- a skirt portion formed unitarily with a rear end of said bobbin trunk portion, and
- an insert member inserted into said bobbin trunk, and said pawl member and said urging member are mounted to said insert member.

13. The fishing reel set forth in claim 12, wherein a nub and an attachment boss are formed on a tubular body of said insert member, and said urging member is mounted to said insert body via said nub and attachment boss.

* * * * *